Aug. 9, 1932.  T. J. SCHUETZ  1,870,532
FRICTION BRAKE
Filed July 15, 1929   2 Sheets-Sheet 1
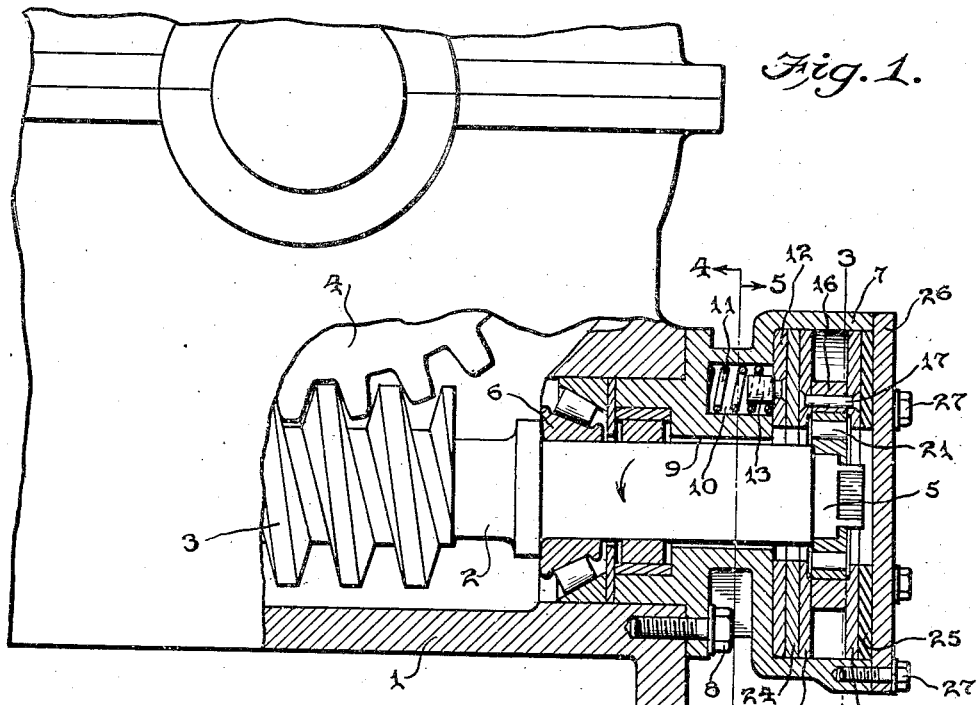
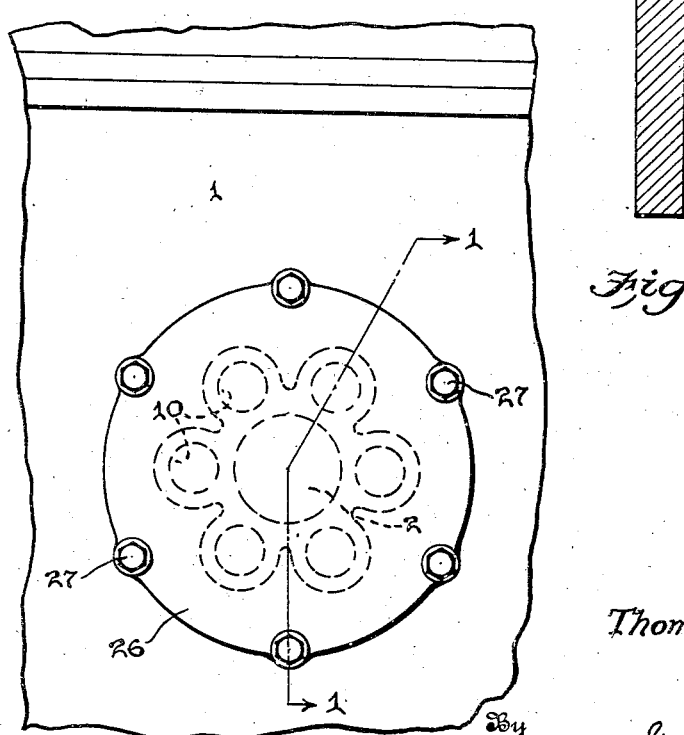
Inventor
Thomas J. Schuetz,
By
George A. Prevost
Attorney Aug. 9, 1932.   T. J. SCHUETZ   1,870,532
FRICTION BRAKE
Filed July 15, 1929   2 Sheets-Sheet 2

Inventor
Thomas J. Schuetz,
By George A. Prevost
Attorney

Patented Aug. 9, 1932

1,870,532

UNITED STATES PATENT OFFICE

THOMAS J. SCHUETZ, OF TULSA, OKLAHOMA, ASSIGNOR TO BRADEN STEEL & WINCH COMPANY, OF TULSA, OKLAHOMA

FRICTION BRAKE

Application filed July 15, 1929. Serial No. 378,474.

My invention consists in new and useful improvements in friction brakes, and relates particularly to that type of machinery known as a worm drive used in connection with hoisting apparatus.

It is the object of my invention to provide a device of this character which is noiseless, requires a minimum of space and one which will act instantly to resist the reverse-rotation of the worm shaft when the hoist drum is under load.

With the above and other objects in view which will appear as the description proceeds my invention consists of the novel features herein set forth, illustrated in the accompanying drawings, and more particularly pointed out in the appended claims.

Referring to the drawings in which numerals of like character designate similar parts throughout the several views:

Fig. 1 is a sectional view of the friction brake applied to the worm gear of a hoisting apparatus.

Fig. 2 is an end view of the same.

Figure 3:
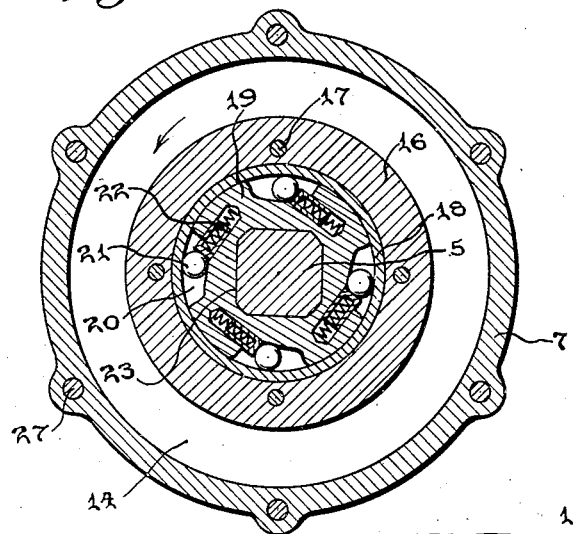
Fig. 3 is a sectional view taken on line 3—3 of Fig. 1 illustrating the roller clutch arrangement.
Figure 4:
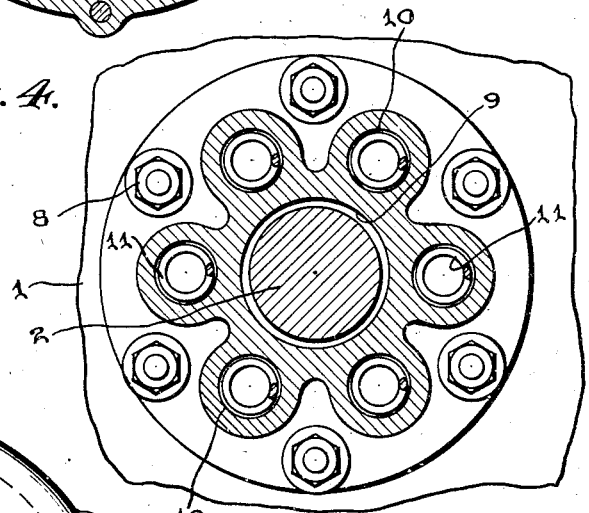
Fig. 4 is a sectional view taken on line 4—4 of Fig. 1.
Figure 5:
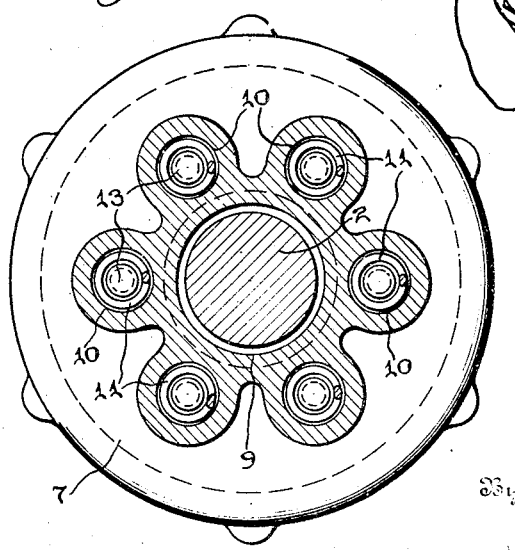
Fig. 5 is a similar view on line 5—5 of Fig. 1.

In the drawings 1 represents the housing of a conventional hoisting machine carrying the worm gear shaft 2, the worm gear 3 of which is arranged for engagement with the drum gear 4. To meet the requirements of my invention, the worm gear shaft 2 is extended and projects beyond the boundaries of the housing 1, being reduced and squared at the end 5 as shown in Figures 1 and 2. The shaft 2 is carried in suitable anti-friction bearings 6 arranged in the housing 1.

7 represents a cup-shaped casting forming a casing, machined to fit into one end of the worm-gear housing and is rigidly secured in place by suitable bolts 8, being centrally apertured as at 9 to receive the end of the shaft 2, said aperture being slightly larger in diameter than said end of the shaft 2, to permit the lubricating fluid in the worm gear housing to circulate into the casing 7. The interior of the casing 7 is provided with a series of circular recesses or wells 10 arranged about the axis of the shaft aperture 9, each of which is adapted to receive a suitable coil spring 11 for the purpose hereinafter set forth.

12 represents a spring plate in the form of a circular disk adapted to fit into the casing 7 and about the inner extremity of the cup, said plate being provided with a series of cylindrical lugs 13 arranged to register with and fit in the spring wells 10 respectively, within the coils of the springs 11 as will be seen from Fig. 1. These lugs 13 may be riveted or otherwise rigidly secured to the spring plate 12.

Two friction plates 14 and 15, similar in shape to the plate 12 are rigidly secured on either side of a roller race casing 16 by means of rivets or other suitable fastening means 17. Within the race casing 16 I provide a circular race collar 18, (Fig. 3) engaging the inner circumference of said race casing and within which the roller race member 19 is adapted to rotate in one direction only. This race member 19 is provided with a plurality of uniformly inclined grooves or notches 20 within which are arranged rollers 21 which are normally forced toward the upwardly inclined surfaces of the notches by suitable spring-actuated pistons 22. The race member 19 is provided centrally with a squared aperture 23 adapted to fit over and engage the squared end 5 of the shaft 2 whereby said race member is caused to rotate with said shaft.

The unit formed by the friction plates 14 and 15, the race casing 16 and the race member 19, is inserted within the casing cup 7 with a friction lining disk 24 of suitable material interposed between the friction plate 14 and the spring plate 12, (Fig. 1), and a second friction lining disk 25 is applied adjacent the outer surface of the friction plate 15 at the outer extremity of the cup portion of the casing 7.

The entire friction braking mechanism is enclosed within the casing 7 by a cover plate 26 secured to the outer edge of the casing 7 by means of suitable bolts 27. As before stated this casing 7 is in communication with the worm gear housing by means of the aperture 9, whereby the lubrication of the braking elements is facilitated. The lubricant in the casing is maintained at the same hydrostatic level as that in the worm gear housing and circulates through said housing and casing to effect a constant co-efficient of friction between the rotating elements of the brake mechanism.

It is obvious that without proper lubrication of the brake elements, there would be undue wear of parts in that the friction discs would be subjected to varied co-efficients of friction due to temperature, dampness, foreign matter, etc., while with arrangement above described, these disadvantages are overcome.

Having thus described the construction and assembly of my improved braking mechanism its operation is as follows:

When the hoisting machine is set into operation the shaft 2 rotates in counter-clockwise direction as shown by the arrows in Figs. 1 and 3, during which rotation the rollers 21 slide freely in their respective recesses 20 in the race member 19, the friction disks and plates being stationary. The race member 19, being the only member positively driven by the shaft 2 through its squared end 5, rotates idly within the ring 18.

Now, assuming that the hoisting mechanism is stopped, and the force of the load on the cable drum, applied to the shaft 2 in the reverse direction, the rollers 21 will be immediately wedged in their inclined notches or recesses 20 to prevent the retrograde movement of the shaft.

The spring plate 12, being under a constant outward pressure from the series of springs 11 causes the friction plates and braking disks to constantly engage one another, thus acting as a brake, setting up a variable friction. This friction may be regulated to suit the requirements by means of the coil springs 11, the resistance required to prevent the backward rotation of the shaft 2, due to a load on the cable drum, being only fractional of the torque required.

It will be noted that the friction torque in my device is held positively constant, regardless of the direction of rotation of the shaft and that no retrograde movement is necessary to its operation. In fact retrograde movement in my structure is most undesirable due to the increased wear on the parts and the resulting uncertain thermal reaction which is of the utmost importance when applied to worm gears.

From the foregoing it is believed that the advantages of my invention may be clearly understood by those skilled in the art without further description, it being borne in mind that numerous changes may be made in the details of construction without departing from the spirit of the invention as set forth in the following claims.

What I claim and desire to secure by Letters Patent is:

1. A friction brake for a rotary shaft, comprising a housing adapted to receive a portion of said shaft, a friction plate unit in said housing surrounding said shaft and comprising a plurality of friction plates secured together with a clutch casing interposed therebetween, a clutch member fixed on said shaft and rotatable therewith, within said clutch casing, and a pressure member adapted to normally prevent the rotation of said unit, said clutch being adapted to rotate freely in one direction and engage said friction plate unit when force is applied in the reverse direction, whereby retrograde rotation of said shaft is prevented.

2. A friction brake for a rotary shaft, comprising a housing adapted to receive a portion of said shaft, a friction plate unit in said housing surrounding said shaft and comprising a plurality of friction plates secured together with a clutch casing interposed therebetween, a clutch member fixed on said shaft and rotatable therewith, within said clutch casing, a pressure member adapted to normally prevent the rotation of said unit, said clutch being adapted to rotate freely in one direction and engage said friction plate unit when force is applied in the reverse direction, whereby retrograde rotation of said shaft is prevented, and braking discs engaging the friction surfaces of said friction plates.

3. A friction brake for a rotary shaft, comprising a housing adapted to receive a portion of said shaft, a friction plate unit in said housing surrounding said shaft and comprising a plurality of friction plates secured together with a clutch casing interposed therebetween, a clutch member fixed on said shaft and rotatable therewith, within said clutch casing, and a pressure member comprising a spring actuated plate surrounding said shaft and adapted to normally prevent the rotation of said unit, said clutch being adapted to rotate freely in one direction and engage said friction plate unit when force is applied in the reverse direction, whereby retrograde rotation of said shaft is prevented.

In testimony whereof I affix my signature.

THOMAS J. SCHUETZ.